S. H. CLAPP.
Brick Kiln.
No. 90,929.
Patented June 8, 1869.
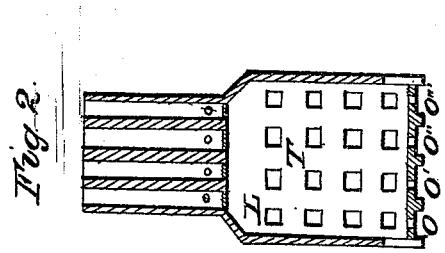
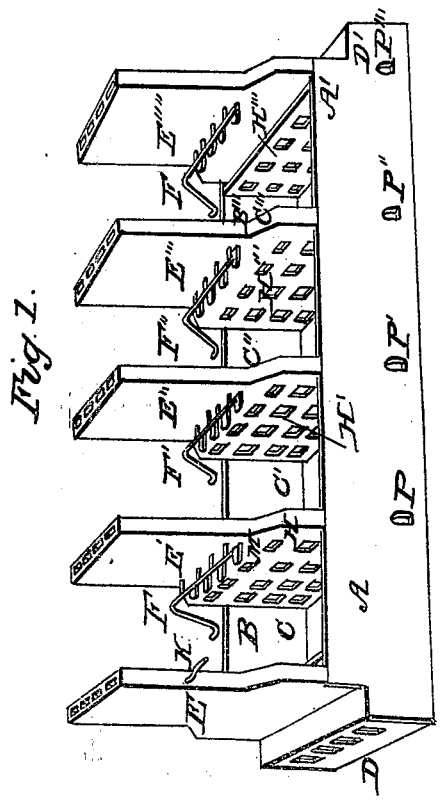
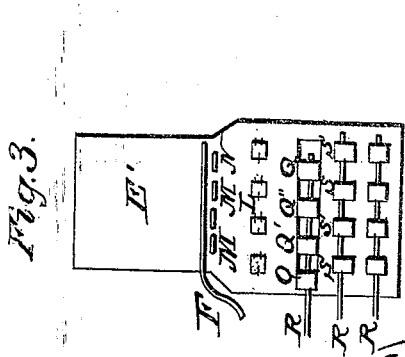
Witnesses
Inventor

United States Patent Office.

S. H. CLAPP, OF MALDEN, MASSACHUSETTS.

Letters Patent No. 90,929, dated June 8, 1869.

IMPROVED BRICK AND TILE-KILN.

The Schedule referred to in these Letters Patent and making part of the same.

*To all whom it may concern:*

Be it known that I, S. H. CLAPP, of Malden, in the county of Middlesex, and State of Massachusetts, have invented certain new and useful Improvements in Kilns for Burning Brick, Tile, &c.; and I do hereby declare that the following is a full and exact description thereof, reference being had to the accompanying drawings, and to the letters of reference marked thereon.

The nature of my invention consists—

First, in combining, with a series of fire-chambers, sets of flues and dampers, arranged to operate in combination with each other, so that the heated products of combustion, as they escape from one kiln, will be conducted into and utilized in the next.

Second, in combining, with the series of flues, steam-pipes, which may throw into them jets of steam, and thus cause strong draughts.

The several fire-chambers may be used successively or together, as may be deemed desirable.

To enable others skilled in the art to make and use my invention, I will proceed to describe its construction and use.

In the drawings—

Figure 1 is a perspective view of my kiln.

Figure 2 is an elevation of one of the flue-stacks.

Figure 3 is a vertical section of the flue-stacks.

I construct my improved kiln as follows:

A $A^i$ B $B^i$ represent the main body of the kiln, which is provided with flue or chimney-stacks E $E^i$ $E^{ii}$ $E^{iii}$ $E^{iv}$, as shown, the base of each flue-stack forming a fire-chamber, one of which, T, is shown in fig. 2.

The fire-chambers of the stacks $E^i$ $E^{ii}$ and $E^{iii}$ are furnished with fuel-doors L L near the top, and P $P^i$ $P^{ii}$ near their bases.

They are also provided with openings S S, which serve to communicate from one apartment of the kiln to another, as from C to C, for instance.

These openings may be closed by dampers Q Q, operated by rods, as shown in fig. 3.

The flues are provided with steam-pipes F $F^i$ $F^{ii}$ $F^{iii}$, through which steam is admitted to force a draught.

Each end of the kiln is provided with an enlarged fire-chamber, D and $D^i$.

Flues O $O^i$ $O^{ii}$ $O^{iii}$, as shown in section, fig. 2, extend under the whole length of the kiln, and have openings, closed by proper dampers, connected with each of the fire-chambers.

The vertical flues in each of the stacks $E^i$ $E^{ii}$ $E^{iii}$ and $E^{iv}$ are provided with dampers M M M M, figs. 1 and 3.

The flues in the stack E are closed by a damper, K.

I use my improved kiln as follows:

The apartments C $C^i$ $C^{ii}$ $C^{iii}$ are packed with bricks, which are arranged and covered in the usual manner, the tops of the bricks being below the fuel-doors L L in the stacks $E^i$ $E^{ii}$ and $E^{iii}$.

A fire is kindled in D, the flues in E being left open until the fire is well started. Then the damper K is turned, so as to close all the flues in E, and the flame and heated products of combustion are sent through the unburned bricks in C.

To secure a draught through C, steam is let into the flues in $E^i$.

As soon as the "water-smoke" in C is drawn off, the dampers M M M M in $E^i$ may be closed, and the heat sent through the bricks in $C^i$, the steam being let into flues in $E^{ii}$.

These operations are continued until the bricks in all the apartments have been acted upon.

During the above process, fires are successively kindled in the fire-chambers in $E^i$ $E^{ii}$ $E^{iii}$, the fuel being supplied through the fuel-doors L L and P $P^i$ $P^{ii}$, &c.

To utilize the heat that would be thrown out during the latter part of the burning of the bricks in the departments $C^{ii}$ and $C^{iii}$, the horizontal flues O $O^i$ $O^{ii}$ $O^{iii}$ are provided, through which the surplus heat is conducted back under the kiln into the first furnace D or into any of the other fire-chambers, as may be desired, when it may be used to throw off the water-smoke from a fresh kiln of bricks.

From the above description it will be seen that my kiln may be a perpetual one; that is, the fire may be constantly maintained within the kiln.

The escaping heat from a section of nearly burned brick may be utilized by applying it to a fresh kiln.

What I claim as my invention, and desire to secure by Letters Patent of the United States, is—

The kiln as shown, provided with end fire-chambers D $D^i$, chimney-stacks E $E^i$ $E^{ii}$, &c., with fire-places at their base-burning chambers C $C^i$ $C^{ii}$ $C^{iii}$, and flues O $O^i$ $O^{ii}$ $O^{iii}$, all constructed and arranged as and for the purposes herein set forth.

S. H. CLAPP.

Witnesses:
WILLIAM EDSON,
FRANK G. PARKER.